United States Patent [19]
d'Alayer de Costemore d'Arc et al.

[11] Patent Number: 6,115,207
[45] Date of Patent: Sep. 5, 2000

[54] CASSETTE STORAGE WITH CARRIER HAVING GRIPPING AND TRANSFER APPARATUS

[75] Inventors: Stephane M. A. d'Alayer de Costemore d'Arc, Genappe, Belgium; Veosamouth Sisopha, Bangkok, Thailand

[73] Assignee: Staar S. A., Brussels, Belgium

[21] Appl. No.: 09/016,440

[22] Filed: Jan. 30, 1998

[30] Foreign Application Priority Data

Jan. 30, 1997 [BE] Belgium ................................. 09700088

[51] Int. Cl.[7] ............................. G11B 15/68; G11B 17/22
[52] U.S. Cl. ................................................. 360/92; 369/34
[58] Field of Search ................................. 360/92; 369/34

[56] References Cited

U.S. PATENT DOCUMENTS

| 3,715,040 | 2/1973 | Polus et al. ........................... 414/267 |
| 5,353,179 | 10/1994 | Elliott et al. ........................... 360/92 |
| 5,371,640 | 12/1994 | Kvifte et al. ........................... 360/92 |
| 5,673,155 | 9/1997 | Motoyama et al. ........................... 360/92 |

FOREIGN PATENT DOCUMENTS

| 0227446 | 1/1987 | European Pat. Off. . |
| 0407305 | 1/1991 | European Pat. Off. . |
| 0623925 | 11/1994 | European Pat. Off. . |
| 2366661 | 4/1978 | France . |
| 19607251 | 8/1997 | Germany . |
| 1205755 | 8/1989 | Japan . |
| 296965 | 4/1990 | Japan . |
| 9106100 | 5/1991 | WIPO . |

*Primary Examiner*—David Davis
*Attorney, Agent, or Firm*—Leydig, Voit & Mayer

[57] ABSTRACT

A loading apparatus for incorporation in an automated system for storing and/or delivering cassettes containing media recording tapes or discs, or other products such as perfumes, cosmetics, and drugs. The apparatus provides storage locations for cassettes in compartments arranged in horizontal rows and vertical columns. In use with media recording tapes or discs, the apparatus includes operating locations at which recording/playback units, for example, VCRs, are mounted in the system in a vertical column adjacent a column of storage compartments. A loading/delivery location is also provided. A loading/unloading apparatus includes a carrier having a movable gripping mechanism mounted for horizontal and vertical movement adjacent the storage unit for gripping and transferring a selected cassette to and from the carrier. The carrier is movable to carry a selected cassette horizontally and vertically between cassette storage compartments and operating, loading, and delivery locations.

20 Claims, 4 Drawing Sheets

CASSETTE STORAGE WITH CARRIER HAVING GRIPPING AND TRANSFER APPARATUS

FIELD OF THE INVENTION

The present invention relates to automated storage and operating systems for cassettes, cases, cartridges and the like which contain information on a recording medium and, more particularly, concerns loading apparatus for such systems having a carrier which grips a cassette in its storage location, transfers it to the carrier, and then carries it to a location where it is either loaded for operation in a playback/recording apparatus within the system or delivered outside the system to a user.

BACKGROUND OF THE INVENTION

Numerous systems of this type have been proposed in the past but they are complex, bulky and expensive as requiring either mechanical means in each storage compartment, as described in the EP-P 0 227446, EP-A 0407305 or FR 2 366 661, to release the selected cassette and translate it so that it engages the transfer device, or a specific gripping device as described in PCT-WO 91/06100 or Japanese Patent 1-205755 which is independent from and thus has to be specifically added to the transfer device.

A gripping and transfer device is disclosed in EP-A-0 623925 but it is bulky and limited to a single column of cassettes which can be translated only through the front edge of said device.

SUMMARY OF THE INVENTION

The main aim of the present invention is to overcome those drawbacks by providing a loading apparatus having a carrier which provides both for the gripping and the transferring of cassettes, thus avoiding the need of a mechanism in each storage compartment or a specific gripping mechanism.

Another aim of the invention is to provide a carrier which has front and back edges with a gripping and transferring mechanism which is capable of gripping a cassette located opposite one edge of the carrier, transferring the cassette to the carrier, shifting the gripping mechanism to a transport position which enables the carrier to be moved in a storage system to another cassette location, and translating the cassette either to a location opposite the same edge of the carrier or translating it completely through the carrier to a location opposite the other edge of the carrier.

A further aim of the invention is to provide cassette storage system having compartments of a very simple shape.

A further aim of the invention is to provide a cassette storage system and loading apparatus made of a few number of parts so that it has a low initial manufacturing cost, is easy to service and maintain both mechanically and to replace cassettes in storage, and is highly reliable in operation.

A further aim of the invention is to provide a system allowing storage of a large number of cassettes within a prescribed volume ensuring a short access time.

To this end the invention provides, in one embodiment, cassette loading apparatus having a carrier which grips, transfers and carries a selected cassette and is movably mounted to carry the selected cassette between cassette locations, the carrier comprising a frame having front and back edges, with the front edge facing a cassette storage location or operating location and the back edge facing a cassette delivery location, a pair of laterally spaced, laterally movable, longitudinal fingers mounted on the frame and carrying endless belts, the belts having linear courses adjacent lateral edges of a cassette on the carrier and a return course, each of the fingers having a portion which extends perpendicular to and overhangs the frame front edge, the projecting portion of each finger having a portion of the respective belt linear course and a parallel return course, and the fingers being laterally movable towards, to engage the projecting portion and belts thereon with and thereby grip, a selected cassette in a storage location, and to move the fingers and belts away from the cassette to a transport position so that the carrier can move between adjacent cassettes; and motor means connected to move the carrier, connected to move the fingers laterally on the carrier, and connected to drive the endless belts on the fingers when engaged with the selected cassette to transfer it longitudinally onto the carrier and completely through the carrier between storage and delivery locations.

In an embodiment for storage of multiple cassettes and automated transfer of individual cassettes to operating locations such as recording/playback machines within a system, the invention provides systems having storage compartments and recording/playback machines arranged in closely spaced horizontal rows and vertical columns, and a loading apparatus comprising a carrier which grips and transfers a selected cassette to-and-from the carrier and is movably mounted in the system to carry the selected cassette horizontally and vertically between cassette storage compartments and operating locations in the recording/playback machines, and to a delivery location where a cassette may be delivered to a user or a replacement cassette inserted by a user and delivered to a storage compartment or an operating location.

Numerous characteristics, advantages, features of the invention will appear from the following description of preferred embodiments to which various modifications can be made without departing from the scope of the invention and in which:

DETAILED DESCRIPTION OF PREFERRED EMBODIMENTS

Figure 5:
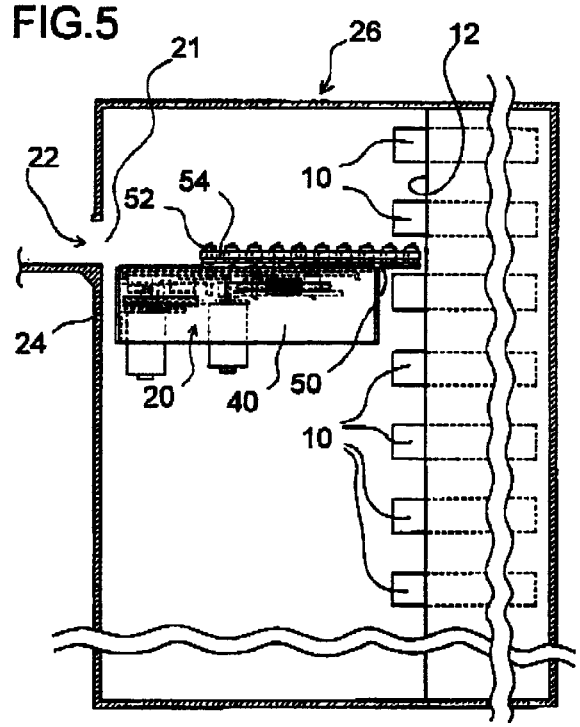
FIG. 5 is a partial lateral section view of the system shown in FIG. 6 showing an opening in the front panel of the unit through which a cassette may be delivered to the user by the carrier, taken along section plane B—B in FIG. 6.
Figure 2:
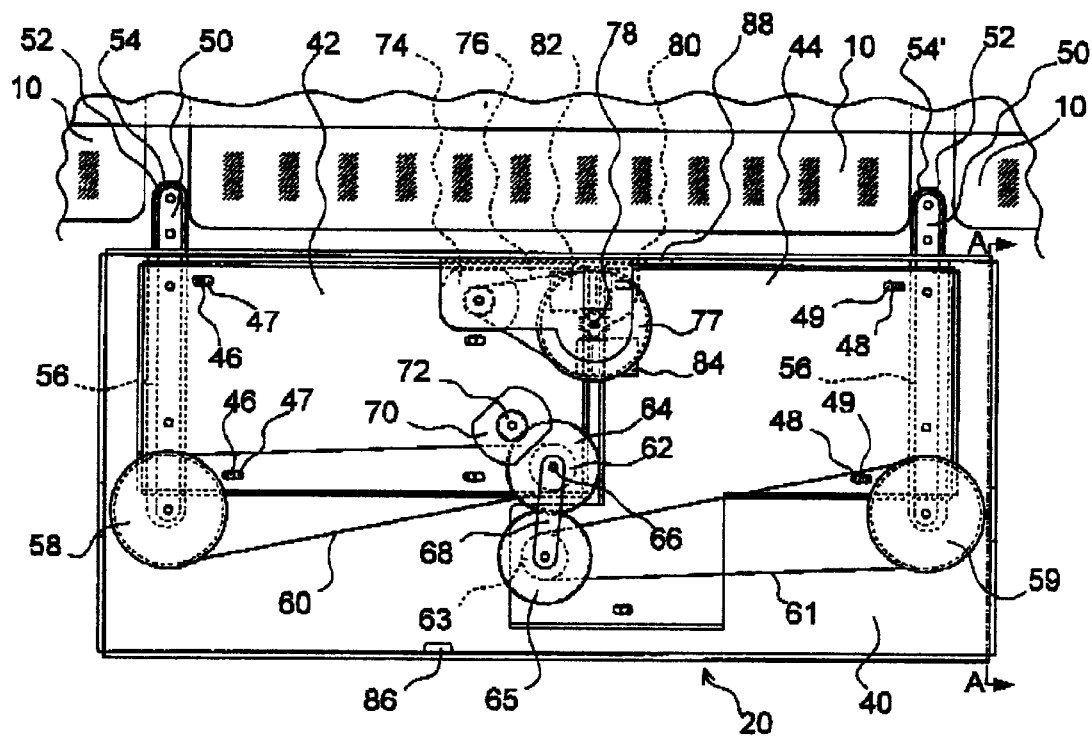
FIG. 2 is a bottom view of the carrier shown in FIG. 3, gripping a cassette in a storage location.
Figure 6:
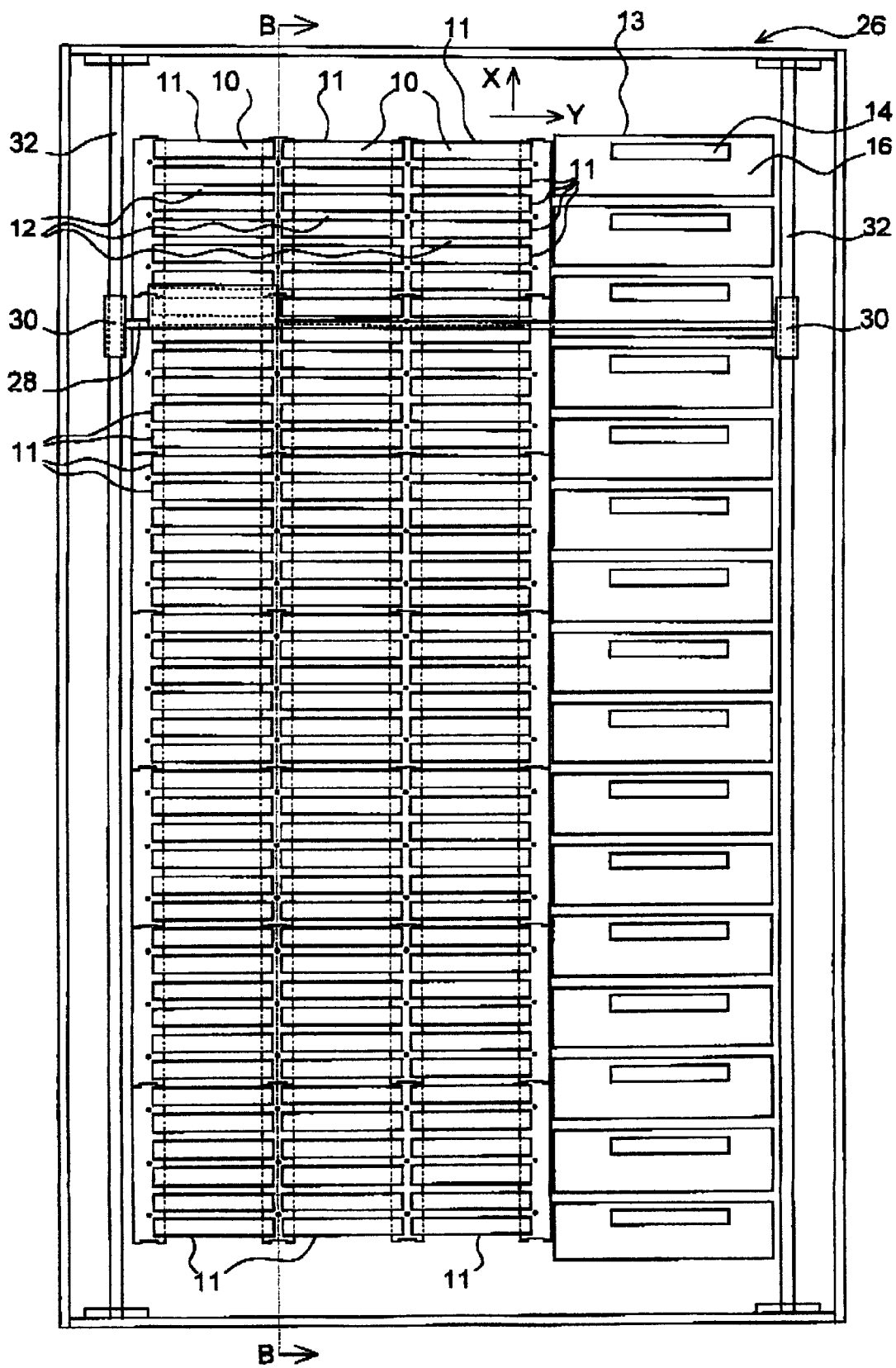
FIG. 6 is a schematic front view of the total automated system incorporating the carrier of FIGS. 1 to 4 in a unit with the front panel of the unit removed.

Referring to FIGS. 5 and 6, the loading apparatus of the invention is incorporated in an automated system for storing and operating cassettes 10 containing recordings on tapes or discs (the term cassettes is used generically to apply to cassettes, cases or cartridges, e.g. for media recording discs, such as optical discs or CD, for media storage tapes, such as video tapes, music tapes, for recording images, text, data, music or other types of information and data, or for products such as perfumes, cosmetics, drugs ). As shown in FIG. 6, the system provides storage locations 11 for cassettes 10 in the form of compartments defined by a storage unit 12 and arranged in horizontal rows and vertical columns and, in the case of recording medium such as tapes, operating locations 13 in the form of slots 14 allowing introduction of cassettes into recording/playback units 16 (e.g. VCR's, CD players, optical disc players, magnetic-tape cassette players, etc.) mounted in the system in a vertical column adjacent a column of the storage compartments.

In accordance with the invention, referring to FIG. 5, a carrier 20 is provided for gripping a cassette 10 in any one of the storage locations 11 or operating locations 13 for transferring the cassette 10 onto the carrier 20, and for moving the carrier 20 to carry the cassette 10 between the storage and operating locations. Furthermore, in carrying out the invention, the system provides a delivery location 21, herein shown in FIG. 5 as an opening 22 in the front panel 24 of the housing 26 of a unit containing the system, to which a cassette 10 may be delivered by the carrier 20 for removal by a user from the system or through which a replacement or returned-from-rental cassette 10 may be introduced by the user to the carrier 20 and delivered by the carrier to a storage or operating location 11,13 of the system.

To achieve the foregoing, the carrier 20 shown in FIGS.1–4 and 7,8, is movable along perpendicular axis X and Y in a conventional way, as by slidably supporting the carrier 20 on horizontal rods or bars 28 which, in turn, as an assembly of the carrier 20 and the horizontal rods 28, is mounted at both ends on sliders 30 carried for vertical movement on vertical rods or bars 32, power means (not shown, such as motor driven belt/pulley drives or screw drives) being provided to position the carrier 20 along the horizontal rods 28 and the carrier assembly vertically on the vertical rods 32 as desired to locate the carrier 20 relative to the storage locations 11, operating locations 13, and delivery location 21. The carrier 20 mounting being conventional is thus just shown diagrammatically in FIG. 6 but not described in detail.

According to the invention, the storage compartments which are of a parallelepipedic profile to achieve a very low manufacturing cost have a depth smaller than that of the cassettes 10 so that the front edge of each stored cassette 10 facing the front-edge of the carrier 20 has an overhang (FIG. 5) beyond the front of the storage unit 12. This spacing arrangement allows an easy insertion or removal of cassettes in/from storage compartments by hand after the front panel 24 of the unit housing has been removed or swung open, without using the transfer capability of the carrier 20, to save time when several cassettes must be loaded into the storage compartments for updating the content of the storage unit 12 while allowing a large number of cassettes 10 to be stored. It will be understood that the carrier 20 may be used for loading a single-cassette-at-a-time by taking it from the opening 22 in the front panel 24 when it has been introduced there by the user and transferring it onto the carrier 20 and carrying it to and loading it into a desired storage compartment(or operating location).

Figure 1:
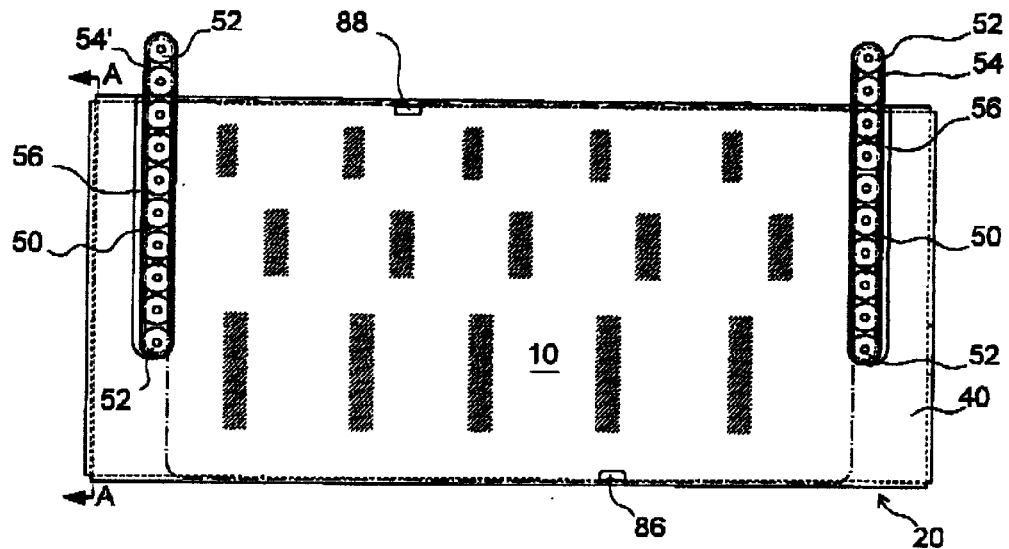
FIG. 1 is a fragmentary top view of a first embodiment of the carrier of an automated system for storage and operation of cassettes, shown more extensively in FIGS. 2–6.
Figure 4:
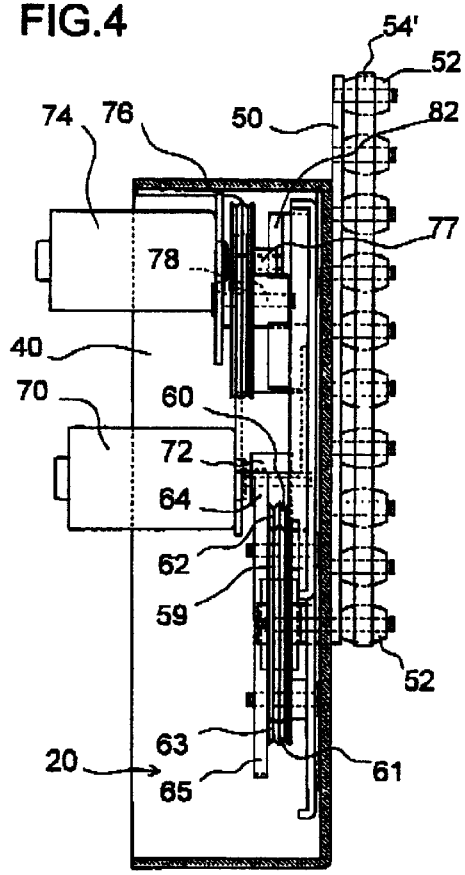
FIG. 4 is a lateral view at a larger scale of the carrier shown in FIGS. 1 and 2, and without a cassette, taken along the section plane A—A of FIG. 1.

In keeping with the invention, the carrier 20 of the loading system (FIGS. 1–3) mainly comprises a frame 40 of a size slightly larger than that of the cassette 10 that it handles and bears on its lower face two support plates 42,44 both mobile with respect to the frame 40 through the combination of shafts 46 mounted on the frame 40 and slots 47 provided in the left-hand plate 42 (as viewed in FIGS. 2,3) and shafts 48 on the frame 40 and slots 49 in the right-hand plate 44. Each support plate 42,44 bears one of a pair or gripping, transfer means herein shown as a pair of fingers 50 each supporting an array of rollers 52 (FIGS. 1, 4), preferably having a cambered profile and guiding an end-less rubber belt 54,54'. Two oblong apertures 56 in the frame 40 allow each finger 50, its rollers 52 and belt 54,54' to protrude through said frame 40 and move laterally. In accordance with the invention, the fingers 50 have an overhang extending beyond the front-edge of the frame 40 facing the cassette storage locations 11 in the compartments of the storage unit 12, which overhang is slightly shorter than the overhang of the cassettes 10 with respect to their storage compartments. The belts 54,54' on the fingers 50 have linear courses which engage lateral edges of a selected cassette 10 on the carrier 20, as shown in FIG. 1, and parallel return courses.

The roller 52 at the extremity of each finger 50 located inside the frame 40 is fixed to the shaft of a pulley 58,59 respectively, (FIG. 3) connected by a belt 60,61 to a driving pulley 62,63 coaxially mounted on a gear 64,65. A shaft 66 fixed to the support plate 42 supports the gear 64 and one end of an arm 68 which can rotate by about 30° around said shaft 66, the other end of said arm 68 supporting a shaft around which the gear 65 can rotate. As a result, the gears 64 and 65 always mesh even during a relative lateral movement of the support plates 42,44. The support plate 42 bears a micromotor 70 having on its output shaft a gear 72 driving the gear 64; accordingly, control of the direction of rotation of the micromotor 70 in one or opposite direction drives the gears 64,65 in a desired direction and accordingly the rollers 52 of each finger 50 and, more particularly, the belts 54,54' which are driven always in opposite directions are effective to transfer a cassette 10 engaged between the belts on the fingers 50 either inwardly or outwardly relative to the carrier 20.

A motor 74 mounted on the carrier frame 40 moves the support plates 42,44 relatively and the fingers 50 and belts 54,54' either apart or towards each other. To this end, the motor 74 drives through a belt 76 a pulley 77 coaxially mounted through a shaft 78 on a gear 80 and powers the relative movement between racks 82,84, attached to the support plates 42,44.

Figure 3:
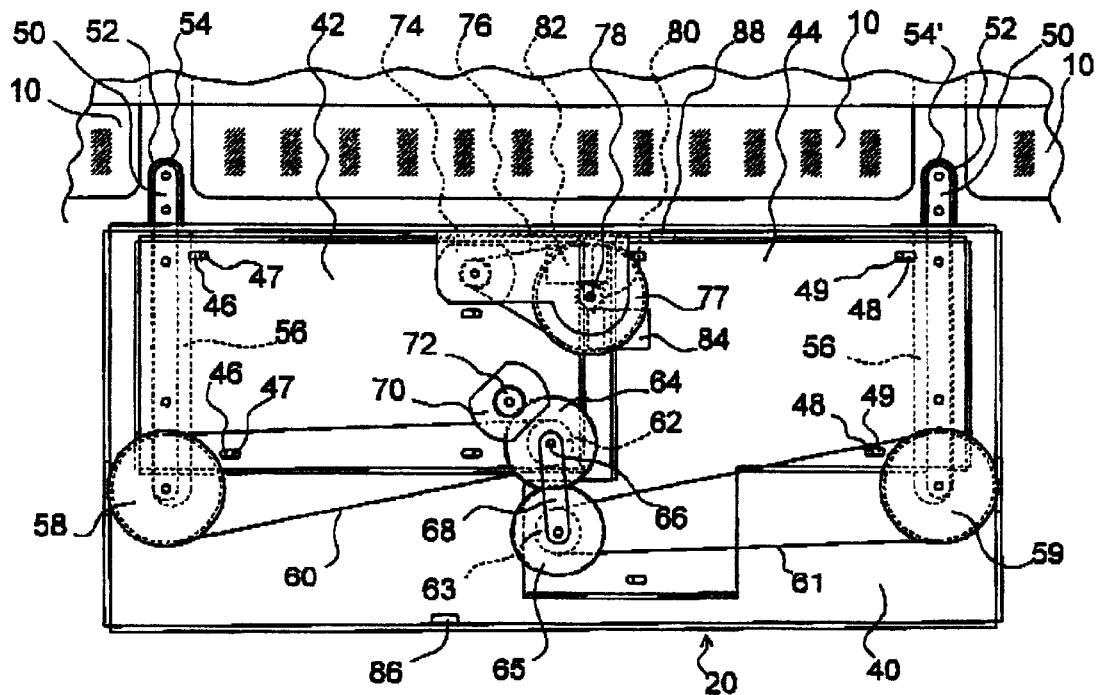
FIG. 3 is similar to FIG. 2, the carrier being in a non-gripping position.

In inoperative position, all the above-described elements are in the position shown on FIG. 3 in which the fingers 50 are spaced apart. The clearance spaces or spacing between stored adjacent cassettes 10, both in vertical and horizontal directions (FIGS. 3, 5) is such that the total height and width of the rollers and belts of the projecting overhang of the fingers 50, which have parallel portions of the transverse dimensions of the respective belt linear course and return course, is less than the clearance spaces or spacing between cassettes 10 in adjacent rows or columns so that the overhanging projecting portion of the fingers 50 easily travels in-between, without engaging, stored adjacent cassettes 10 to reach the selected cassette. Thus, the carrier 20 and the fingers 50 can move horizontally from one column to another (FIG. 6) or vertically from one row to another, thus ensuring a short access time to grip a selected cassette 10 in a row of a storage column and to carry the selected cassette to a storage, operating or delivery location 11,13,21.

In the operation of the carrier 20, when the carrier is moved to a position in front of the selected cassette 10 (FIG. 3) with the frame 40 at the level of the bottom face of a cassette 10, first the motor 74 is powered to move the support plates 42,44 and longitudinal fingers 50 towards each other to grip the cassette 10 by pressing both belts 54,54' against the front part of the lateral edges of the cassette 10. Then, the motor 70 is powered anti-clockwise and, as a result, the pulleys 58,59 rotate clockwise, respectively, anti-clockwise, and both rubber belts 54,54' translate the cassette 10 inwardly onto the frame 40 of the carrier 20. Once the cassette 10 is properly positioned on the frame 40 (FIG. 1), preferably the motor 70 is switched off by opto-detectors 86,88 on the carrier 20 actuated by the cassette 10, and the other motor 74 temporarily powered to move the fingers 50 apart to allow the frame 40 and the fingers 50 to move vertically and/or horizontally without contacting cassettes 10 in storage compartments, and carry a cassette 10 on the carrier 20 to the delivery location 21 provided by the opening 22 in the front panel 24 of the housing for the unit or to a position opposite the entrance slot 14 of a recording/playback unit 16 (FIG. 6) from which it may be transferred from the carrier 20 into the entrance slot 14 of the recording/playback unit 16 for its mechanism to load the cassette for operation within the unit.

Should it be desired to deliver the cassette 10 through the opening 22 (FIG. 5) in the front panel 24 of the storage unit 12 to a user, then the motor 74 is actuated so that the fingers 50 are caused to grip the cassette while the motor 70 drives the pulley 58 and the belt 54 clockwise, and the pulley 59 and the belt 54' anti-clockwise, to translate the cassette 10 completely through the carrier 20 to where it protrudes through the opening 22 and outside the unit. Once the cassette 10 has reached the first roller 52 and thus protrudes through the opening 22, a timer switch powers off the motor 70 while temporarily powering the motor 74 to set the fingers 50 apart to allow the user remove the cassette from the unit.

Should it be desired to load the cassette 10 in a recording/playback unit 16, the pulley 58 is driven to drive the belt 54 anti-clockwise, and the pulley 59 to drive the belt 54' clockwise (as viewed in FIGS. 2,3) so that the cassette 10 is inserted into the slot 14 of a playback/recording unit 16 for automatic loading to play position. Once the cassette 10 has cleared the opto-detector 88, then the fingers 50 are set apart by the motor 74.

When the user wishes to return a cassette to its storage position from a recording/playback unit 16, or by automatic operation after a cassette 10 has finished being played in such unit 16, the carrier 20 is moved into position opposite the unit 16 and the gripping and transferring mechanism operated to grip the cassette 10 in the ejected position protruding from the recording/playback unit 16, transfer it onto the carrier 20, and the carrier 20 is then moved to carry it to a desired storage location or delivery location. To load a new cassette or return a cassette 10, it is introduced through the front opening 22 behind which the carrier 20 has been positioned. The opto-detector 86 detects the introduction of the cassette 10 and is connected in a circuit which actuates, after the lapse of a time delay, the powering of the motor 74 to move the gripping fingers 50 into engagement with the cassette 10. As can be appreciated from FIG. 1, the length of the overhang of the gripping fingers 50 behind the back-edge of the carrier frame 40 is such that the user needs only to insert a cassette by just a third of its width to ensure its being gripped. The motor 70 is then switched on to move the belts 54,54' to translate the cassette on the carrier frame 40 until it reaches the centered position on the carrier 20 shown in FIG. 1 where the other opto-detector 88 detects the cassette and through the circuitry switches off the motor 70 while powering the motor 74 to move the gripping fingers 50 apart and thereby position them clear of the cassettes 10 in the storage compartments of the storage unit 12 and thus allow the carrier 20 to move horizontally and/or vertically to bring the cassette 10 on the carrier 20 in front of a particular storage compartment. Then, the motor 74 is powered once again so that the fingers 50 are moved towards each other and the belts 54,54' into engagement with the cassette while the motor 70 is switched on so that the belts 54,54' translate the cassette 10 outwardly from the carrier 20 until it reaches the back end of its storage compartment (FIG. 2) and clears the optodetector 88; then the motor 70 is switched off while the motor 74 is powered on to set the gripping fingers 50 to release the cassette in its storage compartment. The system is then ready for selecting or storing a new cassette as the fingers 50 can freely move in the space in-between stored adjacent cassettes.

Figure 7:
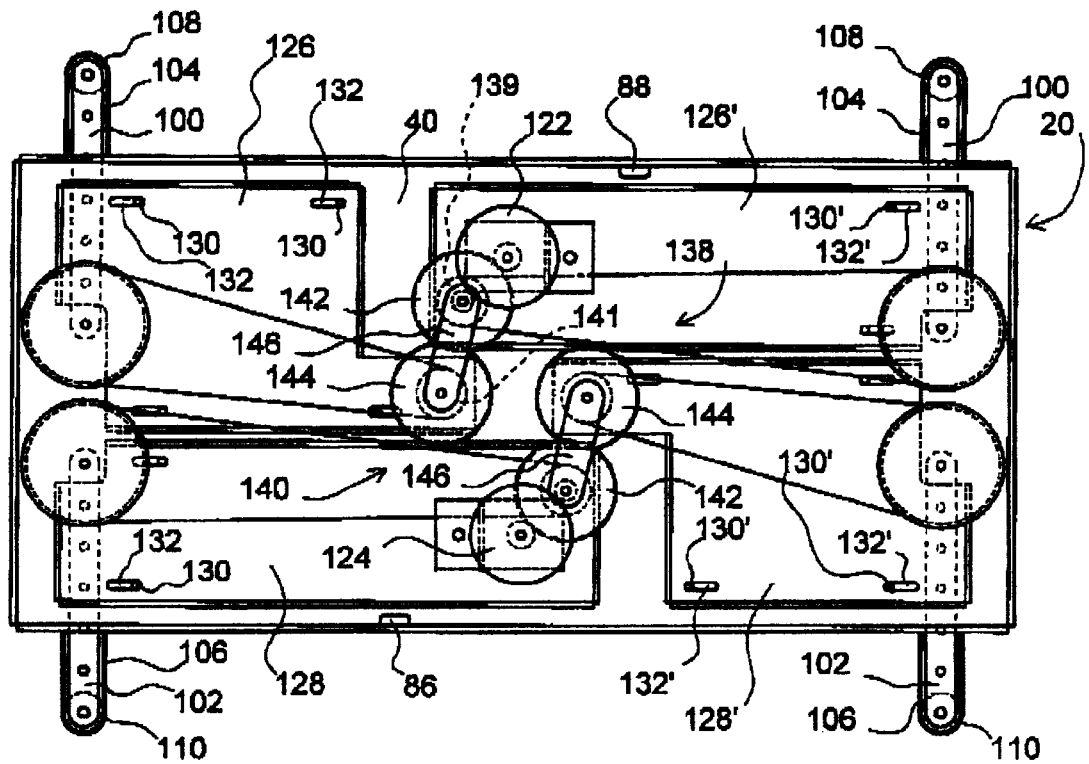
FIG. 7 is a view similar to FIG. 3 and represents a second embodiment of the carrier.
Figure 8:
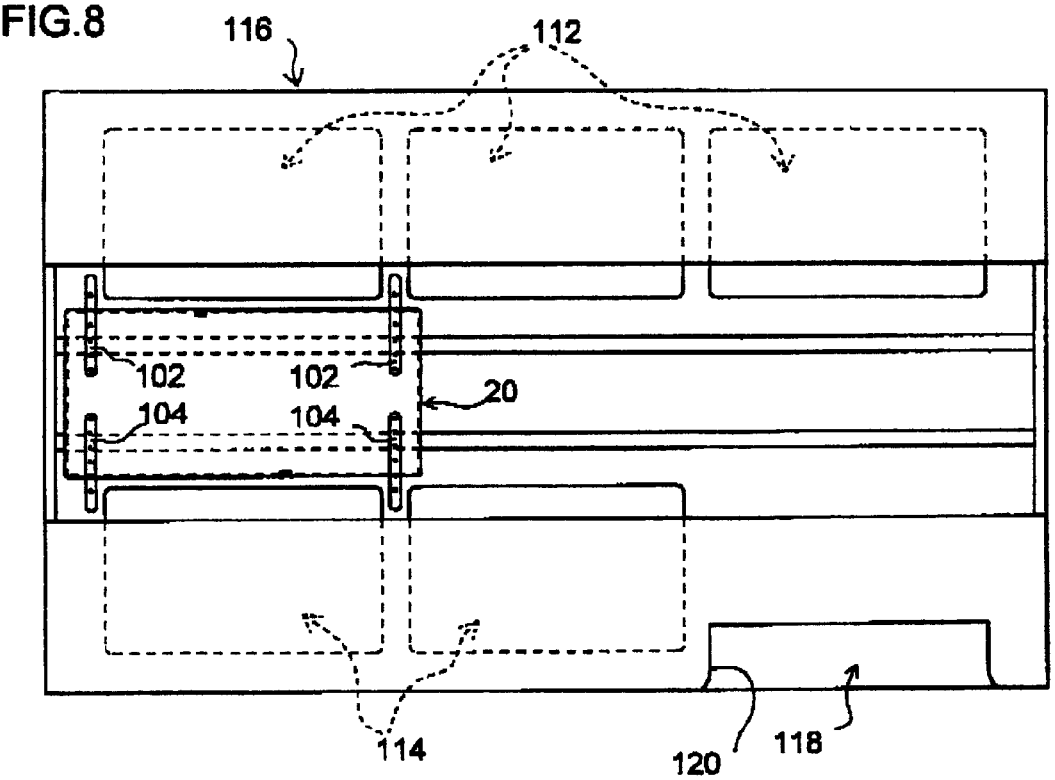
FIG. 8 shows schematically an illustrative system incorporating the carrier of FIG. 7.

In another embodiment of the invention, shown in FIG. 7, the frame 40 of the carrier 20 supports two pairs of longitudinally aligned, laterally spaced gripping fingers 100,102 carrying endless belts 104,106 mounted on rollers 108,110, the pairs of fingers 100,102 being similarly constructed and arranged to the fingers 50 of the previously described embodiment shown in FIGS. 1–6. One front pair of fingers 100 is mounted at the front-edge of the frame 40 and the second back pair of fingers 102 is mounted at the back-edge of the frame 40 of the carrier 20 (FIGS. 7,8). This combination allows cassettes 10 to be stored in two rows of locations 112,114 in a storage unit 116, one row of storage locations 112 facing the front edge of the carrier 20, similar to the arrangement in FIGS. 1–6, the other row of storage locations 114 facing the back-edge of the carrier 20 adjacent to a delivery location 118 in the form of an opening 120 in the housing for the storage unit 116, as shown in FIG. 8. In this construction, the front and back pairs of gripping fingers 100,102 operate as herein-above described, either separately or in tandem, to accommodate the travel distance that the cassette has to undergo.

In accordance with this aspect of the invention, the operation of the belts 104,106 on each pair of the gripping fingers 100,102 is powered by a single motor 122 or 124, and a second motor (not shown) is provided for each pair of fingers 100,102 to move the fingers 100 or 102 toward and away from each other to engage or release a cassette. An arrangement like that shown in FIGS. 2 and 3 of a motor 74 and two racks 82,84 is operable to move each of front and back pairs of finger support plates 126,126' and 128,128' relatively laterally to move the gripping fingers 100 and 102 towards each other and apart for gripping and release. The motors 122,124 which are shown power the belts 104,106 to translate a cassette 10 inwardly and outwardly relative to the carrier frame 40. Each pair of support plates 126,126' and 128,128' is mounted to slide on the carrier frame 40 via shafts 130,130' fixed to the frame 40 which are received in slots 132,132' in the support plates so that each of the front pair of support plates 126,126' are slidable on the frame 40 and are shifted by power towards each other and apart to move the front gripping fingers 100 towards each other and apart for gripping and releasing a cassette 10. The separate motors 122,124 are mounted on the support plates 126',128, respectively, and connected via front and back pulley/belt drives 138,140 to the endless belts 104,106. Considering the front gripping fingers 100, the front motor 122 which is associated with the front gripping fingers 100 is connected through a front gear train to two drive pulleys 139,141 of the front pulley/belt drive 138, one drive pulley 139 being mounted on a shaft supported by one (the right-hand)

support plate 126' and the other drive pulley 141 being supported on the other (left-hand) support plate 126. The drive pulleys 139,141 are connected by drive belts of the front drive 138 to a driven pulley for the innermost roller of each of the front gripping fingers 100. Two meshing gears 142,144 of the front gear train are also connected by an arm 146 which can swivel about the axis of the gear 142 which is mounted to the right-hand support plate 126' and supports the gear 144 by a shaft around which the gear 144 can rotate and which is mounted to the left-hand support plate 126. As a result of this arrangement, the gears 142,144 remain in mesh even during swivelling of the arm 146 during a relative lateral movement of the front support plates 126,126' produced by the motor (not shown) which moves the plates relatively.

A similar arrangement of a geartrain including gears 142,144 and arm 146 is employed in the back pulley/belt drive 140 to connect the back motor 124 to operate the endless belts 106 on the back gripping fingers 102.

For instance, should it be desired to deliver to the user a cassette 10 in a storage location 112 opposite the front edge of the carrier 20, the support plates 126,126' of the frame 40 of this embodiment are moved to shift the front gripping fingers 100 and belts 104 to grip the cassette 100, and the belts 104 actuated to translate the cassette 10 onto the carrier 20. Then, the support plates 126,126' are moved to shift the front gripping fingers 100 apart to a transport position (similar to the position of the fingers shown in FIG. 3), the carrier 20 moved vertically to above or below the row of cassette storage locations, where the fingers can pass between vertically adjacent stored cassettes, and then the carrier 20 moved horizontally to carry the cassette 10 to a delivery position in front of the opening 120. The back fingers 102 are then moved towards each other to grip the cassette and then the belts 106 moved by powering the motor 124 to translate the cassette 10 outwardly from the carrier and through the opening 120.

It should be clear that the diagrammatic illustration of storage locations and a delivery location shown in FIGS. 7,8 can be expanded to a more complex storage arrangement such as shown in FIG. 6, or as otherwise desired.

One of the advantages of the system with the carrier of this invention, which provides for both the gripping and the transfer of a cassette, is its extreme simplicity, compactness and, thus, relatively low cost. Further, the system allows the carrier frame 40 to be very light requiring simple and low-cost power means to move it and obtain a short access time thanks to its low inertia.

As shown in the Figures, it is advantageous to mount an array of identical rollers on the gripping fingers because they ensure an accurate centering of any cassette, even if tilted in its storage compartment and prevent a cassette from being set athwart during translation.

As one can easily understand, the relative movement of the support plates and belts allows them to grip cassettes even if enclosed in protecting envelopes, boxes, or card boards as it can accommodate a variation in width of about 6 mms. Further, said carrier can be easily modified to handle boxes such as for CD, DVD or CD-Rom discs or for other types of products such as perfumes, cosmetics, drugs, as previously noted, in a storage system.

What is claimed is:

1. A cassette gripping and transfer mechanism for cassette storage apparatus, said apparatus having storage locations and operating locations for cassettes arranged in closely spaced horizontal rows and vertical columns which provide vertical clearance spaces of a predetermined horizontal transverse dimension between the cassettes when present in adjacent vertical columns of the storage locations and horizontal clearance spaces of a predetermined vertical transverse dimension between the cassettes when present in adjacent horizontal rows of the storage locations, said gripping and transfer mechanism comprising:

a carrier which is mounted in the apparatus for movement along a horizontal X axis and a vertical Y axis to positions opposite the cassette storage locations and operating locations, said carrier including a frame having an edge facing the cassette storage locations and cassette operating locations;

a pair of laterally spaced fingers mounted on the frame and carrying movable endless belts extending perpendicularly to the frame edge, the belts having linear courses, supports slidably supported on the frame for relative lateral movement, which provide for lateral movement of the fingers with respect to each other on the frame between cassette non-gripping and gripping positions, the fingers having projecting portions and belt portions of the endless belts carried thereon longitudinally overhanging the frame edge, the projecting finger portions and the belt portions carried thereon having a total width and a total height less than the predetermined horizontal transverse dimension and the predetermined vertical transverse dimension, respectively, to allow the projecting finger portions and belt portions, when in the non-gripping position, to move along the horizontal and vertical clearance spaces between, without engaging, the cassettes when present in the-adjacent storage locations, and to allow the fingers to move towards each other to the gripping position, to engage the belts with and thereby grip, lateral edges of a selected cassette when in one of the locations; and drive motors connected to move the supports laterally on the carrier and the fingers between the non-gripping and gripping positions, and connected to drive the endless belts on the fingers when the carrier is opposite the selected cassette in said one of the locations and the fingers are in the gripping position to transfer the selected cassette from said one location onto the carrier for delivery to another position opposite another one of the locations and to transfer the selected cassette when on the carrier to said another one of the locations.

2. The cassette gripping and transfer mechanism according to claim 1 wherein said cassette storage apparatus includes a delivery location, wherein said edge of said frame comprises a front-edge and said frame also includes a back-edge, and one of said front-edge and said back-edge faces the delivery location, wherein the frame accommodates the selected cassette between said front-edge and back-edge when the selected cassette is on the carrier, and wherein said linear courses of the belts extend from the projecting portions of the fingers inwardly to a middle part of the frame to enable the selected cassette to be transferred through the carrier from said one location when ahead of the front-edge of the carrier frame to where the selected cassette projects from the carrier frame into said delivery location which comprises said another one of the locations.

3. The mechanism according to claim 2 wherein the storage location and the delivery location are arranged in the apparatus to face one of said front-edge and said back-edge of the carrier frame.

4. The mechanism according to claim 2 wherein the storage location and the delivery location are arranged in the apparatus to face said front edge and said back edge, respectively, of the carrier frame.

5. A cassette storage apparatus including a cassette gripping and transfer mechanism;

said cassette storage apparatus having cassette storage locations provided in horizontal rows and vertical columns, and a delivery location provided horizontally across a transfer space from the storage locations;

said gripping and transfer mechanism having a carrier winch is adapted to grip a selected cassette when in one of the storage locations and to transfer the selected cassette onto the carrier and which is movable in the transfer space to carry the selected cassette when on the carrier between said one of the storage locations and the delivery location, said carrier comprising:

a frame having a front edge and a back edge, with the front edge facing the storage locations and the back edge facing the delivery location in the apparatus, the frame having a front edge to back edge dimension about equal to a longitudinal dimension of the selected cassette;

a first pair of laterally spaced, laterally movable, longitudinal gripping fingers mounted on said frame and carrying movable endless belts, each of said fingers having a front portion which extends perpendicular to and overhangs the frame front edge, the belts having linear courses on the front portions of the fingers engagable with lateral edges of the selected cassette when in said one of the storage locations when the fingers are moved toward each other to a gripping position and are disengagable from the selected cassette when the fingers are moved away from each other to a non-gripping position, and the fingers having back portions carrying the belts thereon to a middle part of the frame;

drive motors connected to move the fingers relatively laterally on the carrier between gripping and non-gripping positions, and connected to drive the endless belts on the fingers when engaged with the selected cassette to transfer the selected cassette longitudinally completely through the carrier from said one of the storage locations faced by the front edge of the carrier frame to a position where the back portions of the fingers and belt portions thereon transfer the selected cassette into the delivery location.

6. The apparatus according to claim 5 wherein said carrier further includes on said frame, a second pair of laterally spaced, laterally movable fingers carrying endless belts, each of the second pair of fingers and belts having a portion which extends perpendicular to the frame back edge, the second pair of fingers and belts being substantially longitudinally aligned with the first pair of fingers and belts when both are in the non-gripping position which is a position enabling movement of the carrier in the transfer space within the apparatus, and both pairs of belts extending inwardly to a middle part of the carrier, and wherein said cassette storage apparatus also provides cassette storage locations faced by the frame back edge, the second pair of belts being operable to grip the selected cassette when in one of the storage locations faced by the frame back edge and to transfer the selected cassette onto the carrier for carrying to another storage location and the delivery location, the pairs of belts enabling transfer of the selected cassette completely through the carrier by passing the selected cassette from one pair of fingers and belts to the other.

7. The apparatus according to claim 6 wherein said drive motors are associated with each pair of fingers and belts to move the fingers laterally and to move the belts to transfer the selected cassette on the carrier.

8. The apparatus according to claim 6 wherein said endless belts on both pairs of fingers include return courses parallel to the linear courses on the fingers.

9. The apparatus according to claim 5 wherein said endless belts on said pair of fingers include return courses parallel to the linear courses throughout the perpendicular portion of the fingers that overhangs the frame front-edge.

10. The apparatus according to claim 5 wherein the cassette storage locations are arranged to provide both horizontal and vertical clearance spaces between the cassettes when stored in said locations in the apparatus and wherein, with the fingers in the non-gripping position, the carrier is enabled to move both vertically and horizontally with the fingers positioned in the clearance spaces between without contacting the cassettes when stored in said locations.

11. Cassette gripping and transfer mechanism for cassette storage apparatus having rows and columns of closely spaced adjacent storage locations for cassettes, the adjacent storage locations being arranged to provide vertical and horizontal clearance spaces between the cassettes when stored in the adjacent storage locations, said clearance spaces having predetermined transverse dimensions;

said cassette gripping and transfer mechanism comprising:

a cassette carrier which is mounted in the apparatus for movement in a transfer space adjacent the storage locations along an X axis and Y axis to positions opposite the storage locations, said cassette carrier comprising:

a carrier frame having a front edge and a back edge, with the front edge facing the storage locations;

a pair of laterally spaced, longitudinally extending, cassette gripping fingers mounted on the carrier frame and movable relatively laterally towards and away from each other between non-gripping and gripping positions, the fingers each having projecting front portions longitudinally overhanging the carrier frame front edge and back portions longitudinally extending to a middle part between the front edge and the back edge of the carrier frame; and movable endless belts on the front projecting portions and the back portions of the fingers which are movable inwardly and outwardly relative to the carrier frame, the projecting front portions of the fingers including the endless belts thereon each having a total width and height less than the predetermined transverse dimensions of the vertical and horizontal clearance spaces to enable the cassette carrier to move along the X axis and Y axis between the rows and columns of storage locations with the fingers in the non-gripping position and with the projecting front portions of the fingers moving in the horizontal and vertical clearance spaces without engaging the cassettes when stored in the adjacent storage locations.

12. The mechanism according to claim 11 wherein linear courses of the endless belts carried by the laterally spaced fingers are supported by a linear array of rollers mounted on the fingers.

13. The mechanism according to claim 11 wherein the apparatus includes a delivery location across the transfer space from the storage locations, wherein the front edge to back edge of the frame has a dimension about equal to a longitudinal dimension of a selected cassette wherein the selected cassette is accommodated between the front edge and the back edge when on the carrier and wherein linear courses of said belts extend along said back portions of said fingers inwardly to the middle part of the frame to enable the selected cassette to be transferred longitudinally to-and-from and through the carrier from said one of the storage locations ahead of the front-edge to where the cassette projects from the back-edge of the carrier frame into the delivery location.

14. The mechanism according to claim 11 wherein the carrier includes a drive motor and support plates which provide for lateral movement of the spaced fingers, wherein the support plates are connected to the drive motor by racks engaged by a gear driven by the drive motor, and wherein rotation of the gear moves the support plates and the fingers via the racks towards and away from each other.

15. The mechanism according to claim 14 wherein said support plates comprise parallel plates movable relative to each other and respectively supporting the spaced fingers, the racks being connected to move the plates to move the fingers towards and away from each other.

16. The mechanism according to claim 14 wherein said drive motor comprises at least one motor carried by said frame and a gear train and pulley/belt drive connected to drive the endless belts and to move the laterally spaced fingers towards and away from each other whatever the relative position of the support plates.

17. Cassette storage apparatus having rows and columns of closely spaced adjacent storage locations for cassettes, the cassettes being storable in the locations with cassette portions projecting therefrom, the storage locations being arranged to provide vertical and horizontal clearance spaces between the projecting portions of the cassettes stored in adjacent storage locations, said clearance spaces having predetermined transverse dimensions, and a cassette gripping and transfer mechanism comprising:
a cassette carrier which is mounted in the apparatus for movement in a transfer space adjacent the storage locations along an X axis and Y axis to positions opposite the storage locations, said cassette carrier comprising:
a carrier frame having a front edge and a back edge, with the front edge facing the storage locations;
a pair of laterally spaced, longitudinally extending, cassette gripping fingers mounted on the carrier frame and movable relatively laterally towards and away from each other between non-gripping and gripping positions, the fingers each having projecting front portions longitudinally overhanging the carrier frame front edge and back portions longitudinally extending to a middle part between the front edge and the back edge of the carrier frame; and
movable transfer members on the front projecting portions and the back portions of the fingers which are movable inwardly and outwardly relative to the carrier frame, the projecting front portions of the fingers including the transfer members thereon each having a total width and height less than the predetermined transverse dimensions of the vertical and horizontal clearance spaces to enable the cassette carrier to move along the X axis and Y axis between the rows and columns of storage locations with the fingers in the non-gripping position and with the projecting front portions of the fingers moving along the horizontal and vertical clearance spaces without engaging the cassettes when stored in the adjacent storage locations.

18. The apparatus according to claim 17 wherein said carrier includes drive motors mounted on the carrier frame and connected to move the fingers relatively laterally towards and away from each other between the gripping and non-gripping positions, and connected to drive the transfer members on the fingers when engaged with a selected cassette in one of the storage locations to transfer the selected cassette via the back portions of the fingers to a transport position on the carrier frame.

19. The apparatus according to claim 17 wherein said carrier includes drive motors mounted on the carrier frame and connected to move the fingers relatively laterally towards and away between the non-gripping position and the gripping position, and connected to drive the transfer members on the fingers when in the gripping position to transfer a selected cassette via the back portions of the fingers through the carrier frame to a delivery position where the selected cassette overhangs the back edge of the carrier frame.

20. The apparatus according to claim 19 which includes a delivery location arranged horizontally spaced across the transfer space from the rows and columns of storage locations to receive the selected cassette when in the delivery position.

* * * * *